(12) United States Patent
Usui et al.

(10) Patent No.: US 10,270,087 B2
(45) Date of Patent: Apr. 23, 2019

(54) COMPOSITE PARTICLE, NEGATIVE ELECTRODE AND BATTERY

(71) Applicant: NIPPON STEEL & SUMITOMO METAL CORPORATION, Tokyo (JP)

(72) Inventors: Masafumi Usui, Kimitsu (JP); Sukeyoshi Yamamoto, Nishinomiya (JP); Noriyuki Negi, Kisarazu (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 34 days.

(21) Appl. No.: 15/115,928

(22) PCT Filed: Feb. 25, 2015

(86) PCT No.: PCT/JP2015/000955
§ 371 (c)(1),
(2) Date: Aug. 2, 2016

(87) PCT Pub. No.: WO2015/129266
PCT Pub. Date: Sep. 3, 2015

(65) Prior Publication Data
US 2017/0170463 A1 Jun. 15, 2017

(30) Foreign Application Priority Data
Feb. 25, 2014 (JP) .................... 2014-034259

(51) Int. Cl.
*B22F 1/00* (2006.01)
*H01M 4/36* (2006.01)
*C22C 9/02* (2006.01)
*H01M 4/38* (2006.01)
*H01M 4/62* (2006.01)
(Continued)

(52) U.S. Cl.
CPC .......... *H01M 4/364* (2013.01); *B22F 1/0003* (2013.01); *B22F 1/007* (2013.01); *C22C 9/02* (2013.01); *H01M 4/134* (2013.01); *H01M 4/38* (2013.01); *H01M 4/387* (2013.01); *H01M 4/621* (2013.01); *H01M 10/0525* (2013.01); *B22F 2301/10* (2013.01); *C22C 1/0425* (2013.01);
(Continued)

(58) Field of Classification Search
CPC ..................................... H01M 4/131
USPC ..................................... 429/218.1
See application file for complete search history.

(56) References Cited

U.S. PATENT DOCUMENTS 6,544,687 B1 * 4/2003 Sato .............. H01M 4/131
429/218.1
2008/0233479 A1 9/2008 Sung et al.

FOREIGN PATENT DOCUMENTS

EP 1 043 789 1/2013
JP 10-003920 1/1998
(Continued)

*Primary Examiner* — Khanh T Nguyen
(74) *Attorney, Agent, or Firm* — Clark & Brody

(57) ABSTRACT

Provided is a composite particle which can improve the capacity per volume and charge-discharge cycle characteristics. The composite particle includes a plurality of specific particles and a binding material. The specific particle contains an alloy phase. The alloy phase undergoes thermoelastic diffusionless transformation when releasing metal ions or occluding metal ions. The binding material contains at least one of non-graphite carbon and a carbon precursor. The plurality of specific particles bind with each other via the binding material.

20 Claims, 4 Drawing Sheets

(51) Int. Cl.
    *H01M 4/134*     (2010.01)
    *H01M 10/0525*   (2010.01)
    *C22C 1/04*          (2006.01)
    *H01M 4/02*          (2006.01)

(52) U.S. Cl.
    CPC .. *H01M 2004/027* (2013.01); *H01M 2220/20* (2013.01); *H01M 2220/30* (2013.01)

(56)             References Cited

FOREIGN PATENT DOCUMENTS

JP      2003-223892     8/2003
    JP      2004-087264     3/2004
    JP      2005-158721     6/2005
    JP      2010-161078     7/2010

* cited by examiner

COMPOSITE PARTICLE, NEGATIVE ELECTRODE AND BATTERY

TECHNICAL FIELD

The present invention relates to a composite particle, negative electrode and battery.

BACKGROUND ART

Recently, small electronic appliances such as home video cameras, note PCs, and smart phones have become widespread, and attaining higher capacity and longer service life of batteries has become a technical problem.

Given that hybrid vehicles, plug-in hybrid vehicles, and electric vehicles will be further spread, size reduction of batteries is also a technical problem.

At present, graphite-based negative electrode active materials are utilized for lithium ion batteries. However, graphite-based negative electrode active materials have technical problem as described above.

Accordingly, alloy-based negative electrode active materials have gained attention, which have higher capacity than those of the graphite-based negative electrode active materials. As an alloy-based negative electrode active material, silicon (Si)-based negative electrode active materials and tin (Sn)-based negative electrode active materials are known. To realize a lithium ion battery having a smaller size and a longer life, various studies have been conducted on the above described alloy-based negative electrode active materials.

However, an alloy-based negative electrode active material repeatedly undergoes large expansion and contraction in volume at the time of charging/discharging. For that reason, the capacity of the alloy-based negative electrode active material is prone to deteriorate. For example, a volume expansion/contraction rate of graphite associated with charging is about 12%. In contrast, the volume expansion/contraction rate of Si single substance or Sn single substance associated with charging is about 400%. For this reason, if a negative electrode plate of Si single substance or Sn single substance is repeatedly subjected to charging and discharging, significant expansion and contraction occur, thereby causing cracking in negative electrode compound which is applied on the current collector of the negative electrode plate. Consequently, the capacity of the negative electrode plate sharply decreases. This is chiefly caused by the fact that some of the active substances are freed due to volume expansion/contraction and thereby the negative electrode plate loses electron conductivity.

US2008/0233479A (Patent Literature 1) proposes a method for solving the above described problem of an alloy-based negative electrode active material. To be specific, the negative electrode material on Patent Literature 1 includes a Ti—Ni superelastic alloy, and Si particles formed in the superelastic alloy. Patent Literature 1 describes that a large expansion/contraction change of Si particle which occur following occlusion and release of lithium ions can be suppressed by a superelastic alloy.

CITATION LIST

Patent Literature

Patent Literature 1: US2008/0233479

However, the charge-discharge cycle characteristics of the same secondary battery disclosed in Patent Literature 1 may not be sufficiently improved by the technique disclosed in the same. Most of all, it is assumed to be highly difficult to actually produce the negative electrode active material proposed by Patent Literature 1.

SUMMARY OF INVENTION

It is an objective of the present invention to provide a composite particle which can improve the capacity per volume and/or charge-discharge cycle characteristics thereof.

The composite particle according to the present embodiment includes a plurality of specific particles and a binding material. The specific particle contains an alloy phase. The alloy phase undergoes thermoelastic diffusionless transformation when releasing or occluding metal ions. The binding material contains at least one of non-graphite carbon and a carbon precursor. The plurality of specific particles are bound with each other via the binding material.

The composite particle according to the present embodiment can improve the capacity per volume and/or charge-discharge cycle characteristics thereof.

DESCRIPTION OF EMBODIMENTS

Figure 1:
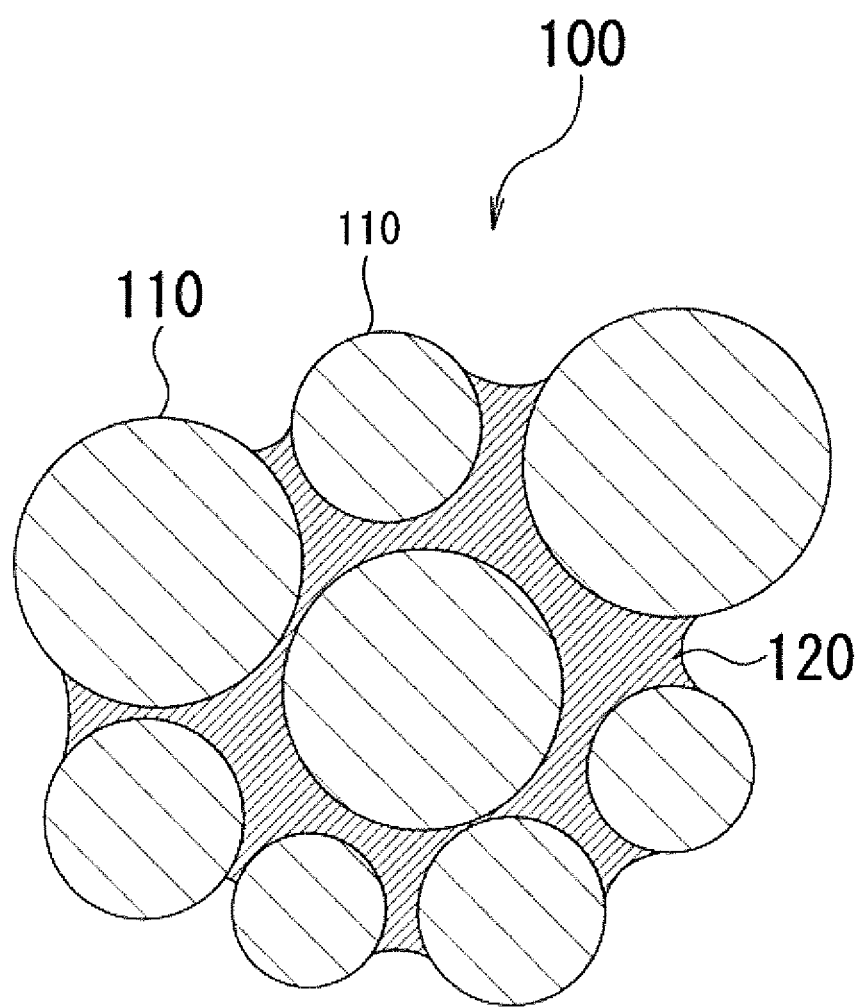
FIG. 1 is a schematic sectional view of a composite particle relating to an embodiment of the present invention.

Hereinafter, with reference to the drawings, embodiments of the present invention will be described in detail. Like parts or corresponding parts in the drawings are given a like reference symbol and description thereof will not be repeated.

A composite particle according to the present embodiment includes a plurality of specific particles and a binding material. The specific particle contains an alloy phase. The alloy phase undergoes thermoelastic diffusionless transformation when releasing or occluding metal ions. The binding material contains at least one of non-graphite carbon and a carbon precursor. The composite particle according to the present embodiment is formed by the plurality of specific particles being bound with each other via the binding material.

A "negative electrode active material" referred herein is preferably a negative electrode active material for nonaqueous electrolyte secondary batteries. A "thermoelastic diffusionless transformation" referred herein is so-called thermoelastic martensitic transformation. A "metal ion" refers to, for example, a lithium ion, magnesium ion, sodium ion, and the like. A preferable metal ion is lithium ion.

The specific particle may contain other phases different from the above described alloy phases. The other phases include, for example, a silicon (Si) phase, a tin (Sn) phase, other alloy phases (alloy phases which do not undergo thermoelastic diffusionless transformation) excepting the above described alloy phases, and the like.

Preferably, the above described alloy phases are main components (main phases) of the specific particle. "Main component" refers to a component which occupies not less than 50% by volume. The alloy phase may contain impurities to the extent that the spirit of the present invention is unimpaired. However, the impurities are contained preferably as little as possible.

A negative electrode formed by using the composite particle of the present embodiment as the negative electrode active material has a higher volumetric discharge capacity (discharge capacity per volume) than that of a negative electrode made of graphite (a theoretical capacity of graphite is 833 mAh/cm$^3$), when used in a nonaqueous electrolyte secondary battery. Further, a nonaqueous electrolyte secondary battery using a negative electrode including the composite particle of the present embodiment has a higher capacity retention ratio than one using a conventional alloy-based negative electrode. Therefore, the composite particle has a potential to sufficiently improve the charge-discharge cycle characteristics of the nonaqueous electrolyte secondary battery.

A possible reason why the capacity retention ratio is high is that strain due to expansion/contraction that occurs at the time of charging/discharging is relaxed by thermoelastic diffusionless transformation of the alloy phase. Further, the composite particle of the present embodiment has a binding material. For that reason, it is considered that decomposition of the electrolyte solvent is suppressed. This is also considered to contribute to a high capacity retention ratio.

In the composite particle, a proportion of a total mass of the plurality of specific particles to a sum of the total mass of the plurality of specific particles and a mass of the binding material is preferably 95% to 99.5%.

In the composite particle, at least some of the plurality of specific particles are preferably exposed to the outside.

The alloy phase may be of any one of the following types 1 to 4.

The alloy phase of type 1 undergoes thermoelastic diffusionless transformation when occluding metal ions, and undergoes reverse transformation when releasing metal ions. In this case, the alloy phase is a matrix phase in a normal state.

The alloy phase of type 2 undergoes reverse transformation when occluding metal ions, and undergoes thermoelastic diffusionless transformation when releasing metal ions. In this case, the alloy phase is a martensite phase in a normal state.

The alloy phase of type 3 undergoes supplemental deformation (slip deformation or twin deformation) when occluding metal ions, and returns to the original martensite phase when releasing metal ions. In this case, the alloy phase is a martensite phase in a normal state.

The alloy phase of type 4 transforms from a martensite phase to another martensite phase when occluding metal ions, and returns to the original martensite phase when releasing metal ions. In this case, the alloy phase is a martensite phase in a normal state.

In the case of the alloy phase of type 1, preferably, the crystal structure of the alloy phase after thermoelastic diffusionless transformation is either of 2H, 3R, 6R, 9R, 18R, M2H, M3R, M6R, M9R, and M18R in the Ramsdell notation, and the crystal structure of the alloy phase after reverse transformation is $DO_3$ in the Strukturbericht notation. More preferably, the crystal structure of the alloy phase after thermoelastic diffusionless transformation is the above described 2H, and the crystal structure of the alloy phase after reverse transformation is the above described $DO_3$.

In the case of the alloy phase of type 1, preferably, the alloy phase contains Cu and Sn, and also contains the above described 2H structure after thermoelastic diffusionless transformation, and the above described $DO_3$ structure after reverse transformation.

The above described alloy phase may contain one or more selected from the group consisting of Ti, V, Cr, Mn, Fe, Co, Ni, Zn, Al, Si, B, and C, and Sn, with balance being Cu and impurities.

The above described alloy phase may contain one or more selected from the group consisting of δ phase of F-Cell structure, ε phase of 2H structure, η' phase of monoclinic crystal, and a phase having $DO_3$ structure, each including site deficiency.

All of these δ phase, ε phase, η' phase, and phase having $DO_3$ structure, each including site deficiency form a storage site and a diffusion site of metal ions (Li ions, etc.). For that reason, the volumetric discharge capacity and the cycle characteristics when the composite particle is used as the negative electrode active material are further improved.

In the above described negative electrode active material, a volume expansion ratio or volume contraction ratio of a unit cell of the above described alloy phase before and after the phase transformation is preferably not more than 20%, and more preferably not more than 10%. The volume expansion ratio of unit cell is defined by the following Formula (1), and the volume contraction ratio of unit cell is defined by the following Formula (2).

(Volume expansion ratio of unit cell)=[(volume of unit cell when metal ions are occluded)−(volume of unit cell when metal ions are released)]/(volume of unit cell when metal ions are released)×100     (1)

(Volume contraction ratio of unit cell)=[(volume of unit cell when metal ions are occluded)−(volume of unit cell when metal ions are released)]/(volume of unit cell when metal ions are occluded)×100     (2)

The volume of unit cell at the time of releasing, which corresponds to a crystal lattice range of unit cell at the time of occluding, is substituted into "volume of unit cell when metal ions are released" in Formulas (1) and (2).

The above described composite particle can be used as active material for making up an electrode, particularly electrode of a nonaqueous electrolyte secondary battery. An example of the nonaqueous electrolyte secondary battery is a lithium ion secondary battery.

Hereinafter, composite particles according to the present embodiment will be described in detail.

<Composite Particle>

A composite particle relating to the present embodiment is a negative electrode active material. The composite particle includes a plurality of specific particles containing an alloy phase, and a binding material. The alloy phase undergoes thermoelastic diffusionless transformation when releasing metal ions represented by Li ions, or occluding the metal ions, as described above. The thermoelastic diffusionless transformation is also called as thermoelastic martensitic transformation. Hereinafter, in the present description, the thermoelastic martensitic transformation is simply referred to as "M transformation" and the martensite phase as "M phase". An alloy phase that undergoes M transformation when occluding or releasing metal ions is also referred to as a "specific alloy phase".

The binding material contains at least one of non-graphite carbon and a carbon precursor as the main component. The composite particle relating to an embodiment of the present invention is formed of the plurality of specific particles being bound with each other via the binding material. That is, as shown in FIG. 1, this composite particle 100 contains a plurality of specific particles 110 and a binding material 120.

(1) Specific Particle

A specific particle is a particle containing a specific alloy phase. The specific particle may be made of a specific alloy phase. That is, the specific particle may be made of a specific alloy phase alone, or may contain any other phase other than the specific alloy phase. The other phase includes, for example, a silicon (Si) phase, a tin (Sn) phase, and any other alloy phases (alloy phases which do not undergo thermoelastic diffusionless transformation) other than the above described alloy phases. In the composite particle, a proportion of a total mass of the plurality of specific particles to a sum of the total mass of the plurality of specific particles and a mass of the binding material is preferably 95% to 99.5%. In the composite particle, at least some of the plurality of specific particles are preferably exposed to the outside.

The specific alloy phase is dominantly made up of at least one of M phase and a matrix phase. The specific alloy phase repeats occlusion/release of metal ions at the time of charging/discharging. Then, the specific alloy phase undergoes M transformation, reverse transformation, supplemental deformation, etc. in response to occlusion and release of metal ions. These transformation behaviors mitigate strain which is caused by expansion and contraction of the alloy phase when occluding and releasing metal ions.

The specific alloy phase may be of any one of the above described types 1 to 4. Preferably, the specific alloy phase is of type 1. That is, the specific alloy phase preferably undergoes M transformation when occluding metal ions, and undergoes reverse transformation when releasing metal ions.

The crystal structure of the specific alloy phase is not specifically limited. If the alloy phase is of type 1, and the crystal structure of the specific alloy phase (that is, a matrix phase) after reverse transformation is $\beta_1$ phase ($DO_3$ structure), the crystal structure of the specific alloy phase (that is, M phase) after M transformation is, for example, $\beta_1'$ phase ($M18R_1$ structure of monoclinic crystal or $18R_1$ structure of orthorhombic crystal), $\gamma_1'$ phase (M2H structure of monoclinic crystal or 2H structure of orthorhombic crystal), $\beta_1''$ phase ($M18R_2$ structure of monoclinic crystal or $18R_2$ structure of orthorhombic crystal), $\alpha_1'$ phase (M6R structure of monoclinic crystal or 6R structure of orthorhombic crystal), and the like.

If the crystal structure of the matrix phase of the specific alloy phase is $\beta_2$ phase (B2 structure), the crystal structure of M phase of the specific alloy phase is, for example, $\beta_2'$ phase (M9R structure of monoclinic crystal or 9R structure of orthorhombic crystal), $\gamma_2'$ phase (M2H structure of monoclinic crystal or 2H structure of orthorhombic crystal), and $\alpha_2'$ phase (M3R structure of monoclinic crystal or 3R structure of orthorhombic crystal).

If the matrix phase of the specific alloy phase has a face-centered cubic lattice, the crystal structure of M phase of the specific alloy phase has, for example, a face-centered tetragonal lattice, and a body-centered tetragonal lattice.

Such symbols as the above described 2H, 3R, 6R, 9R, 18R, M2H, M3R, M6R, M9R, and M18R are used as the method of denoting crystal structures of a layered construction according to Ramsdell's classification. The symbols H and R mean that respective symmetries in the direction perpendicular to the lamination plane are hexagonal symmetry and rhombohedral symmetry. If there is no M appended at the beginning, it means that the crystal structure is an orthorhombic crystal. If there is M appended at the beginning, it means that the crystal structure is a monoclinic crystal. Even if same classification symbols are used, there are cases in which distinction is made by the difference in the order of the layers. For example, since $\beta_1'$ phase and $\beta_1''$ phase, which are two kinds of M phase, have a different layered construction, there are cases in which they are distinguished by being denoted as $18R_1$ and $18R_2$, or $M18R_1$ and $M18R_2$ etc., respectively.

In General, M transformation and reverse transformation in normal shape memory effects and pseudoelastic effects often involve volume contraction or volume expansion. When a composite particle relating to the present embodiment electrochemically releases or occludes metal ions (for example, lithium ions), it is considered that the crystal structure often changes (transforms) in consistent with the phenomena of volume contraction or volume expansion.

However, the composite particle according to the present embodiment will not be particularly limited by such restriction. When M transformation or reverse transformation occurs following occlusion and release of metal ions in the specific alloy phase, there may be generated other crystal structures than the crystal structure that appears at the time of ordinary shape memory effects and pseudoelastic effects.

When the specific alloy phase is of type 3, the specific alloy phase undergoes slip deformation or twin deformation following occlusion or release of metal ions. In slip deformation, since dislocation is introduced as the lattice defect, reversible deformation is difficult. Therefore, when the specific alloy phase is of type 3, it is preferable that twin deformation dominantly occurs.

[Chemical Composition of Specific Particle]

The chemical composition of a specific particle containing the above described specific alloy phase will not be particularly limited provided that the crystal structure at the time of M transformation and reverse transformation contains the above described crystal structures.

When the specific alloy phase is of type 1, the chemical composition of the specific particle contains, for example, Cu (copper) and Sn (tin).

When the specific alloy phase is of type 1, preferably, the crystal structure of the specific alloy phase after reverse transformation caused by discharge of metal ions is $DO_3$ structure, and the crystal structure of the specific alloy phase after M transformation caused by occlusion of metal ions is 2H structure.

Preferably, the chemical composition of specific particle contains Sn, with the balance being Cu and impurities. More preferably, the specific particle contains 10 to 20 at % or 21 to 27 at % of Sn, with the balance being Cu and impurities, wherein the negative electrode active material contains 2H structure after M transformation, and $DO_3$ structure after reverse transformation. A more preferable Sn content in the specific particle is 13 to 16 at %, 18.5 to 20 at %, or 21 to 27 at %.

The chemical composition of specific particle may contain one or more selected from the group consisting of Ti, V, Cr, Mn, Fe, Co, Ni, Zn, Al, Si, B, and C, and Sn, with the balance being Cu and impurities.

Preferably, the chemical composition of the specific particle in this case contains: Sn: 10 to 35 at %, and one or more selected from the group consisting of Ti: 9.0 at % or less, V: 49.0 at % or less, Cr: 49.0 at % or less, Mn: 9.0 at % or less, Fe: 49.0 at % or less, Co: 49.0 at % or less, Ni: 9.0 at % or less, Zn: 29.0 at % or less, Al: 49.0 at % or less, Si: 49.0 at % or less, B: 5.0 at % or less, and C: 5.0 at % or less, with the balance being Cu and impurities. The above described Ti, V, Cr, Mn, Fe, Co, Ni, Zn, Al, Si, B and C are optional elements.

A preferable upper limit of Ti content is 9.0 at % as described above. The upper limit of Ti content is more preferably 6.0 at %, and further preferably 5.0 at %. A lower limit of Ti content is preferably 0.1 at %, more preferably 0.5 at %, and further preferably at 1.0 at %.

A preferable upper limit of V content is 49.0 at % as described above. The upper limit of V content is more preferably 30.0 at %, further preferably 15.0 at %, and furthermore preferably 10.0 at %. A lower limit of V content is preferably 0.1 at %, more preferably 0.5 at %, and further preferably at 1.0 at %.

A preferable upper limit of Cr content is 49.0 at % as described above. The upper limit of Cr content is more preferably 30.0 at %, further preferably 15.0 at %, and furthermore preferably 10.0 at %. A lower limit of Cr content is preferably 0.1 at %, more preferably 0.5 at %, and further preferably at 1.0 at %.

A preferable upper limit of Mn content is 9.0 at % as described above. The upper limit of Mn content is more preferably 6.0 at %, and further preferably 5.0 at %. A lower limit of Mn content is preferably 0.1 at %, more preferably 0.5 at %, and further preferably at 1.0 at %.

A preferable upper limit of Fe content is 49.0 at % as described above. The upper limit of Fe content is more preferably 30.0 at %, further preferably 15.0 at %, and furthermore preferably 10.0 at %. A lower limit of Fe content is preferably 0.1 at %, more preferably 0.5 at %, and further preferably at 1.0 at %.

A preferable upper limit of Co content is 49.0 at % as described above. The upper limit of Co content is more preferably 30.0 at %, further preferably 15.0 at %, and furthermore preferably 10.0 at %. A lower limit of Co content is preferably 0.1 at %, more preferably 0.5 at %, and further preferably at 1.0 at %.

A preferable upper limit of Ni content is 9.0 at % as described above. The upper limit of Ni content is more preferably 5.0 at %, and further preferably 2.0 at %. A lower limit of Ni content is preferably 0.1 at %, more preferably 0.5 at %, and further preferably at 1.0 at %.

A preferable upper limit of Zn content is 29.0 at % as described above. The upper limit of Zn content is more preferably 27.0 at %, and further preferably 25.0 at %. A lower limit of Zn content is preferably 0.1 at %, more preferably 0.5 at %, and further preferably at 1.0 at %.

A preferable upper limit of Al content is 49.0 at % as described above. The upper limit of Al content is more preferably 30.0 at %, further preferably 15.0 at %, and furthermore preferably 10.0 at %. A lower limit of Al content is preferably 0.1%, more preferably 0.5 at %, and further preferably at 1.0 at %.

A preferable upper limit of Si content is 49.0 at % as described above. The upper limit of Si content is more preferably 30.0 at %, further preferably 15.0 at %, and furthermore preferably 10.0 at %. A lower limit of Si content is preferably 0.1 at %, more preferably 0.5 at %, and further preferably at 1.0 at %.

A preferable upper limit of B content is 5.0 at %. The lower limit of B content is preferably 0.01 at %, more preferably 0.1 at %, further preferably 0.5 at %, and furthermore preferably 1.0 at %.

A preferable upper limit of C content is 5.0 at %. The lower limit of C content is preferably 0.01 at %, more preferably 0.1 at %, further preferably 0.5 at %, and furthermore preferably 1.0 at %.

Preferably, the specific particle contains one or more selected from the group consisting of δ phase of F-Cell structure containing site deficiency, ε phase of 2H structure containing site deficiency, η' phase of monoclinic crystal containing site deficiency, and a phase having $DO_3$ structure containing site deficiency. Hereinafter, these δ phase, ε phase, η' phase, and phase having $DO_3$ structure, each containing site deficiency is also referred to as "site deficient phase". Here, "site deficiency" means a state of a crystal structure in which occupancy ratio is less than 1 in a specific atomic site.

These site deficient phases include a plurality of site deficiencies in the crystal structure. These site deficiencies function as a storage site or a diffusion site of metal ions (such as Li ions). Therefore, if a negative electrode active material contains an alloy phase which becomes 2H structure after M transformation and becomes $DO_3$ structure after reverse transformation, and at least one phase among the above described site deficient phases, the volumetric discharge capacity and the cycle characteristics of the negative electrode active material are further improved.

The chemical composition of a specific particle may further contain a Group 2 element and/or rare earth metal (REM) for the purpose of increasing discharge capacity. The Group 2 elements include, for example, magnesium (Mg) calcium (Ca) and the like. REMs include, for example, lanthanum (La), cerium (Ce), praseodymium (Pr), neodymium (Nd) and the like.

The specific particle may be made up of the above described specific alloy phase, or may contain the above described specific alloy phase and another active material phase which is metal ion-active. Another active material phase includes, for example, a tin (Sn) phase, a silicon (Si) phase, an aluminum (Al) phase, a Co—Sn alloy phase, a $Cu_6Sn_5$ compound phase (η' phase or η phase) and the like.

[Volume Expansion Ratio and Volume Contraction Ratio of Specific Alloy Phase]

When the above described specific alloy phase undergoes M transformation or reverse transformation following occlusion and release of metal ions, preferable volume expansion ratio and volume contraction ratio of unit cell of the specific alloy phase are both not more than 20%. In this case, it is possible to sufficiently relax the strain due to a volume change which occurs following occlusion and release of metal ions. The volume expansion ratio and the volume contraction ratio of unit cell of the specific alloy phase are both more preferably not more than 10%, and further preferably not more than 5%.

The volume expansion/contraction ratio of the specific alloy phase can be measured by an in-situ X-ray diffraction during charging/discharging. To be more specific, an electrode plate of including specific particle (composite particle), a separator, a counter electrode lithium, and electrolytic solution are placed and sealed in a dedicated charge/discharge cell including a window made of beryllium which transmits X-ray, within a glove box in pure argon gas atmosphere in which moisture is controlled such that due point is not more than −80° C. Then, this charge/discharge cell is mounted onto the X-ray diffraction apparatus. After mounting, an X-ray diffraction profile of the specific alloy phase is obtained in each of an initially charged state and an initially discharged state in the course of charging and discharging. From this X-ray diffraction profile, a lattice constant of the specific alloy phase is found. From the lattice constant, it is possible to calculate the volume change ratio in consideration of crystal lattice correspondence of the specific alloy phase.

When the shape of X-ray diffraction profile changes due to full width at half maximum etc. in the charge-discharge cycling process, analysis is performed after repeating charging and discharging 5 to 20 times as needed. Then, an average value of volume change ratio is found from a plurality of X-ray diffraction profiles having high reliability.

[Analysis Method of Crystal Structure of Alloy Phase Contained by Composite Particle]

(1) The crystal structure of the phase (including a specific alloy phase) contained in the composite particle can be analyzed by Rietveld method based on the X-ray diffraction profile obtained by using an X-ray diffraction apparatus. To be more specific, the crystal structure is analyzed by the following method.

For a composite particle before use for a negative electrode, X-ray diffraction measurement is performed on the composite particle to obtain measured data of X-ray diffraction profile. Based on the obtained X-ray diffraction profile (measured data), the configuration of phases in the composite particle is analyzed by Rietveld method. For the analysis by Rietveld method, either of "RIETAN2000" (program name) or "RIETAN-FP" (program name) which are general-purpose analysis software is used.

(2) For the composite particle in the negative electrode before charging in the battery as well, the crystal structure of the contained phase (including the specific alloy phase) is determined by the same method as in (1). To be specific, the battery, which is in an uncharged state, is disassembled within the glove box in argon atmosphere, and the negative electrode is taken out from the battery. The negative electrode taken out is enclosed with Myler foil. Thereafter, the perimeter of the Myler foil is sealed by a thermocompression bonding machine. Then, the negative electrode sealed by the Myler foil is taken out of the glove box.

Next, a measurement sample is fabricated by bonding the negative electrode to a reflection-free sample plate (a plate of a silicon single crystal which is cut out such that a specific crystal plane is in parallel with the measurement plane) with hair spray. The measurement sample is mounted onto the X-ray diffraction apparatus and X-ray diffraction measurement of the measurement sample is performed to obtain an X-ray diffraction profile. Based on the obtained X-ray diffraction profile, the crystal structure of the phases in the composite particle (including the specific alloy phase) in the negative electrode is determined by the Rietveld method.

(3) Crystal structures of the phases in the composite particle (including the specific alloy phase) in the negative electrode after charging one to multiple times and after discharging one to multiple times are determined by the same method as that in (2).

To be more specific, the battery is fully charged in a charging/discharging test apparatus. The fully charged battery is disassembled in the glove box, and a measurement sample is fabricated by a method similar to that of (2). The measurement sample is mounted onto the X-ray diffraction apparatus and X-ray diffraction measurement is performed.

Moreover, the battery is fully discharged, and the fully discharged battery is disassembled in the glove box and a measurement sample is fabricated by a method similar to that of (2) to perform X-ray diffraction measurement.

<Production Method of Specific Particle>

The method for producing a specific particle containing the above described specific alloy phase will be described.

Molten metal of a raw material of specific particle is produced. For example, molten metal having the above described chemical composition is produced. The molten metal is produced by melting starting material by an ordinary melting method such as arc melting or resistance heating melting. Next, an ingot (bulk alloy) is produced by an ingot casting method by using the molten metal.

Preferably, a thin cast piece or a particle is produced by subjecting the molten metal to rapid solidification. This method is called a rapid solidification method. Examples of the rapid solidification method include a strip casting method, a melt-spinning method for producing ribbons, a gas atomization method, a melt spinning method for producing fibers, a water atomization method, an oil atomization method, and the like.

The bulk alloy (ingot) obtained by melting is (1) cut, (2) coarsely crushed by a hammer mill etc., or (3) finely pulverized mechanically by a ball mill, an attritor, a disc mill, a jet mill, a pin mill, and the like to adjust it into a necessary particle size. When the bulk alloy has ductility and ordinary pulverization is difficult, the bulk alloy may be subjected to cutting and pulverization by a grinder disc, which is embedded with diamond abrasive particles, and the like. When M phase due to stress induction is formed in these pulverization processes, the formation ratio thereof is adjusted as needed by appropriately combining the alloy design, heat treatment, and pulverization conditions thereof. When powder generated by an atomization method can be used as melted or as heat treated, there may be cases where no pulverization process is particularly needed. Moreover, when melted material is obtained by a strip casting method and crushing thereof is difficult due to its ductility, the melted material is adjusted to have a predetermined size by being subjected to mechanical cutting such as shearing. Moreover, in such a case, the melted material may be heat treated in a necessary stage, to adjust the ratio between M phase and a matrix phase, and the like.

When the constitution ratio, etc. of the specific alloy phase is adjusted by heat treatment, the material may be rapidly cooled as needed after being retained at a predetermined temperature for a predetermined time period in inert atmosphere. In this occasion, the cooling rate may be adjusted by selecting a quenching medium such as water, salt water, and oil according to the size of the material, and setting the quenching medium to a predetermined temperature.

(II) Binding Material

A binding material contains at least one of non-graphite carbon and a carbon precursor as the main component. The binding material binds with a plurality of specific particles. Where, the "main component" in the binding material means that the proportion of at least one of non-graphite carbon and a carbon precursor to the whole binding material is not less than 60% in at %. This proportion is preferably not less than 70%, more preferably no less than 80%, and further preferably not less than 90%.

The binding material preferably contains a carbon precursor as the main composed. This is because decomposition of the electrolyte solvent is stably suppressed if a carbon precursor is the main component of the binding material.

The non-graphite carbon is either one of amorphous carbon and turbostratic carbon. Where, "amorphous carbon" refers to carbon which may have short-distance order (on the order of several to several tens of atoms), but has no long-distance order (the order of several hundreds to several thousands of atoms). "Turbostratic carbon" refers to carbon composed of carbon atoms which have a turbostratic structure in parallel with the direction of hexagonal network plane, but exhibit no crystallographic regularity in three-dimensional directions. Turbostratic carbon is preferably confirmed by a transmission type electron microscopy (TEM), and the like.

Amorphous carbon is obtained by firing thermoplastic organic substance such as thermoplastic resin. In embodiments of the present invention, thermoplastic resins include, for example, petroleum pitch, coal pitch, synthetic thermoplastic resin, natural thermoplastic resin, and mixtures thereof. Among those, pitch powder is particularly preferable. This is because pitch powder is melted and carbonized in the heating process, consequently allowing a plurality of specific particles to be suitably bound with each other. Pitch powder is also preferable in that it has a small irreversible capacity even when fired at a low temperature.

A carbon precursor is carbon-rich substance before thermoplastic organic substance is transformed into non-graphite carbon when the thermoplastic organic substance is heated.

The binding material may contain other components such as graphite, conductive carbonaceous particulate, and tin particle within a range not impairing the spirit of the present invention.

Graphite may be either one of natural graphite and artificial graphite. Preferably, graphite is natural graphite. Graphite may be a mixture of natural graphite and artificial graphite. Preferably, graphite is a spherical graphite granule which is formed by aggregation of a plurality of scaly graphites. Examples of scaly graphite include, in addition to natural graphite and artificial graphite, fired mesophase carbon (bulk mesophase) made from tar and pitch, and those obtained by graphitizing cokes (raw coke, green coke, pitch coke, needle coke, petroleum coke, etc.), and the like. Graphite is particularly preferably granulated by using a plurality of natural graphites having high crystallinity.

The conductive carbonaceous particulate directly adheres to graphite. The conductive carbonaceous particulate includes, for example, carbon blacks such as Ketjenblack, furnace black, and acetylene black, carbon nanotube, carbon nanofiber, carbon nanocoil, and the like. Particularly preferable conductive carbonaceous particulate is acetylene black. The conductive carbonaceous particulate may be a mixture of different kinds of carbon blacks, etc.

<Production Method of Composite Particle>

The production method of a composite particle relating to the present embodiment includes a mixing step and a heat treatment step.

In the mixing step, specific particles (powder) and powder of thermoplastic organic substance are mixed in a solid phase to prepare mixed powder.

The heat treatment step is carried out after the mixing step. In the heat treatment step, the mixed powder is heat treated under non-oxidizing atmosphere (under inert gas atmosphere, under vacuum atmosphere, and the like) at a temperature in a range of 300° C. to 1200° C., preferably 300° C. to 1000° C., more preferably 300° C. to 800° C., further preferably 300° C. to 700° C., and most preferably 350° C. to not more than 700° C. As a result of this, the powder of thermoplastic organic substance softens and causes the plurality of specific particles (powder) to be bound with each other. Further, the powder of thermoplastic organic substance is transformed into at least one of non-graphite carbon and a carbon precursor, thereby forming a binding material. As a result of that, a composite particle of the present embodiment is obtained. Setting the heating temperature to not more than 700° C. suppresses phase decomposition of the alloy phase. For that reason, it is possible to improve the charge-discharge cycle characteristics. Setting the heating temperature not less than 300° C. makes it possible to achieve stable binding between the plurality of specific particles via the thermoplastic organic substance (binding material). In this way, when the heating temperature is in the above described range, it is possible to form an electrode which is excellent in charge-discharge cycle characteristics.

<Production Method of Negative Electrode>

A negative electrode using a composite particle relating to an embodiment of the present invention can be produced by a method well known to those skilled in the art.

For example, a binder such as polyvinylidene fluoride (PVDF), polymethyl methacrylate (PMMA), polytetrafluoroethylene (PTFE), and styrene-butadiene rubber (SBR) is admixed to the above-described composite particle (negative electrode active material), and further carbon material powder such as natural graphite, artificial graphite, and acetylene black is admixed thereto to impart sufficient conductivity to the negative electrode. After being dissolved by adding a solvent such as N-methylpyrrolidone (NMP), dimethylformamide (DMF) and water, the binder is stirred well using a homogenizer and glass beads if necessary, and formed into a slurry. This slurry is applied on an active substance support member such as a rolled copper foil and an electrodeposited copper foil and is dried. Thereafter, the dried product is subjected to pressing. Through the above described processes, a negative electrode plate is produced.

The amount of the binder to be admixed is preferably about 5 to 10 mass % from the viewpoint of the mechanical strength and battery characteristics of the negative electrode. The support member is not limited to a copper foil. The support member may be, for example, a foil of other metals such as stainless steel and nickel, a net-like sheet punching plate, a mesh braided with a metal element wire and the like.

The particle size of the composite particle affects the thickness and density of electrode, that is, the capacity of electrode. The thickness of electrode is preferably as thin as possible. This is because a smaller thickness of electrode can increase the total surface area of the composite particle included in a battery. Therefore, an average particle size of the composite particle is preferably not more than 100 μm. As the average particle size of the composite particle decreases, the reaction area of the particle increases, thereby resulting in excellent rate characteristics. However, when the average particle size of the composite particle is too small, the properties and condition of the surface of the particle change due to oxidation etc. so that it becomes difficult for lithium ions to enter into the particle. In such a case, the rate characteristics and the efficiency of charging/discharging may decline over time. Therefore, the average particle size of the composite particle is preferably 0.1 to 100 μm, and more preferably 1 to 50 μm.

<Production Method of Battery>

A nonaqueous electrolyte secondary battery according to the present embodiment includes a negative electrode, a positive electrode, a separator, and an electrolytic solution or electrolyte as described above. The shape of the battery may be a cylindrical type, a square shape as well as a coin type and a sheet type. The battery of the present embodiment may be a battery utilizing a solid electrolyte such as a polymer battery and the like.

The positive electrode of the battery of the present embodiment preferably contains a transition metal compound containing a metal ion as the active material. More preferably, the positive electrode contains a lithium (Li)- containing transition metal compound as the active material. An example of the Li-containing transition metal compound is $LiM_{1-x}M'_xO_2$, or $LiM_{2y}M'O_4$. Where, in the chemical formulae, $0 \leq x$, $y \leq 1$, and M and M' are respectively at least one kind of barium (Ba), cobalt (Co), nickel (Ni), manganese (Mn), chromium (Cr), titanium (Ti), vanadium (V), iron (Fe), zinc (Zn), aluminum (Al), indium (In), tin (Sn), scandium (Sc) and yttrium (Y).

However, the battery of the present embodiment may use other positive electrode materials such as transition metal chalcogenides; vanadium oxide and lithium (Li) compound thereof; niobium oxide and lithium compound thereof; conjugated polymers using organic conductive substance; Shepureru phase compound; activated carbon; activated carbon fiber; and the like.

The electrolytic solution of the battery of the present embodiment is generally a nonaqueous electrolytic solution in which lithium salt as the supporting electrolyte is dissolved into an organic solvent. Examples of lithium salt include $LiClO_4$, $LiBF_4$, $LiPF_6$, $LiAsF_6$, $LiB(C_6H_5)$, $LiCF_3SO_3$, $LiCH_3SO_3$, $Li(CF_3SO_2)_2N$, $LiC_4F_9SO_3$, $Li(CF_2SO_2)_2$, LiCl, LiBr, and LiI. These may be used singly or in combination. The organic solvent is preferably carbonic ester, such as propylene carbonate, ethylene carbonate, ethyl methyl carbonate, dimethyl carbonate, and diethyl carbonate. However, other various kinds of organic solvents including carboxylate ester and ether are usable. These organic solvents may be used singly or in combination.

The separator is placed between the positive electrode and the negative electrode. The separator serves as an insulator. Further, the separator greatly contributes to the retention of electrolyte. The battery of the present embodiment may include a well known separator. The separator is made of, for example, polypropylene or polyethylene, which is polyolefin-based material, or mixed fabric of the two, or a porous body such as a glass filter. The above described negative electrode, positive electrode, separator, and electrolytic solution or electrolyte are accommodated in a container to produce a battery.

Hereinafter, the composite particle, the negative electrode, and the battery of the present embodiment described above will be described in more detail by using Examples. It is noted that the composite particle, the negative electrode, and the battery of the present embodiment will not be limited to Examples shown below.

EXAMPLES

Composite particles, negative electrodes, and coin batteries of Inventive Examples 1 to 9 of the present invention, and Comparative Examples 1 to 4 as shown in Table 1 were produced by the following method. Then, change in the crystal structure of alloy phase due to charging/discharging was confirmed. Further, initial discharge capacity (discharge capacity per unit volume), efficiency of initial charging/discharging, and cycle characteristics of each battery were investigated.

TABLE I

| | Production process | | Composite particle | | | Efficiency of initial charging/ discharging (%) | Cycle retention ratio after 30 cycles (%) | Initial discharge capacity (mAh/g) | Initial discharge capacity (mAh/cm³) |
|---|---|---|---|---|---|---|---|---|---|
| | Mixing ratio (mass ratio) Specific particle/ (Specific paricle + Meltable organic powder) | Heat treatment temperature (° C.) | Chemical composition of specific particle | Binding material | Mass ratio Specific particle/ (Specific particle + Binding material) | | | | |
| Inventive Example 1 | 98% | 400 | Cu: 70.0 at % Sn: 20.0 at % Al: 10.0 at % | Carbon precursor | 99% | 63.0 | 49.4 | 128.6 | 1119 |
| Inventive Example 2 | 96% | 400 | Cu: 70.0 at % Sn: 20.0 at % Al: 10.0 at % | Carbon precursor | 98% | 60.9 | 50.4 | 121.9 | 1061 |
| Inventive Example 3 | 92% | 400 | Cu: 70.0 at % Sn: 20.0 at % Al: 10.0 at % | Carbon precursor | 96% | 55.5 | 59.0 | 119.1 | 1036 |
| Inventive Example 4 | 90% | 400 | Cu: 70.0 at % Sn: 20.0 at % Al: 10.0 at % | Carbon precursor | 95% | 53.5 | 61.4 | 114.1 | 993 |
| Inventive Example 5 | 88% | 400 | Cu: 70.0 at % Sn: 20.0 at % Al: 10.0 at % | Carbon precursor | 94% | 51.2 | 64.6 | 109.1 | 949 |
| Inventive Example 6 | 86% | 400 | Cu: 70.0 at % Sn: 20.0 at % Al: 10.0 at % | Carbon precursor | 93% | 48.9 | 67.7 | 106.9 | 930 |
| Comparative Example 1 | — | — | Cu: 70.0 at % Sn: 20.0 at % Al: 10.0 at % | None | 100% | 64.6 | 46.2 | 133.5 | 1161 |
| Inventive Example 7 | 96% | 400 | Cu: 84.0 at % Sn: 15.0 at % Ni: 1.0 at % | Carbon precursor | 98% | 42.8 | 72.3 | 148.9 | 1310 |
| Comparative Example 2 | — | — | Cu: 84.0 at % Sn: 15.0 at % Ni: 1.0 at % | None | 100% | 45.4 | 66.3 | 163.1 | 1435 |
| Inventive Example 8 | 96% | 400 | Cu: 75.0 at % Sn: 15.0 at % Co: 10.0 at % | Carbon precursor | 98% | 45.1 | 94.6 | 126.2 | 1111 |
| Comparative Example 3 | — | — | Cu: 75.0 at % Sn: 15.0 at % Co: 10.0 at % | None | 100% | 47.8 | 86.7 | 138.2 | 1216 |

TABLE I-continued

| | Production process | | Composite particle | | | Efficiency | Cycle retention | | |
| --- | --- | --- | --- | --- | --- | --- | --- | --- | --- |
| | Mixing ratio (mass ratio) Specific particle/ (Specific paricle + Meltable organic powder) | Heat treatment temperature (° C.) | Chemical composition of specific particle | Binding material | Mass ratio Specific particle/ (Specific particle + Binding material) | of initial charging/ discharging (%) | ratio after 30 cycles (%) | Initial discharge capacity (mAh/g) | Initial discharge capacity (mAh/cm³) |
| Inventive Example 9 | 96% | 400 | Cu: 72.0 at % Sn: 23.0 at % Zn: 5.0 at % | Carbon precursor | 98% | 71.8 | 75.7 | 219.9 | 1935 |
| Comparative Example 4 | — | — | Cu: 72.0 at % Sn: 23.0 at % Zn: 5.0 at % | None | 100% | 76.2 | 69.4 | 240.8 | 2119 |

Inventive Example 1 of the Present Invention

[Production of Composite Particle]

(1) Production of Specific Particle

Molten metal was produced such that the chemical composition of specific particle is Cu-20.0 at % Sn-10.0 at % Al, that is, the chemical composition of specific particle contains 20.0 at % of Sn and 10.0 at % of Al, with the balance being Cu and impurities. To be specific, a mixture of 752.4 g of copper, 402.0 g of tin, and 45.6 g of aluminum was subjected to high-frequency induction melting to produce molten metal. The molten metal was rapidly solidified by bringing it into contact with a water-cooled roll made of copper which rotates at a circumferential speed of 300 m/minute, to obtain a cast piece of flaky shape (strip casting (SC) method). The obtained cast piece was pulverized, and thereafter classified by a sieve of 45 μm to obtain alloy particle of an average particle diameter of 20 to 30 μm. This alloy particle was used as the specific particle.

The obtained specific particle was composed of an alloy phase, and the chemical composition of the alloy phase was Cu-20.0 at % Sn-10.0 at % Al. That is, the chemical composition of the alloy phase of the specific particle contained 20.0 at % of Sn and 10.0 at % of Al, with the balance being Cu and impurities.

(2) Production of Composite Particle

The alloy particle and coal pitch powder were invested into a locking mixer (manufactured by Aichi Electric Co., Ltd.) such that a proportion of the mass of the alloy particle to the sum of the mass of the above-described alloy particle (specific particle) and the mass of the coal pitch powder (a softening point of 86° C., an average particle diameter of 20 μm, and a residual carbon ratio of 50% after heating at 1000° C.) which was the binding material was 98.0%, thereby preparing mixed powder.

Next, the above-described mixed powder was invested into a graphite crucible, and the mixed powder was heated at a temperature of 200° C. for 1 hour in a nitrogen gas flow. Thereafter, the mixed powder was further heated at 400° C. for 1 more hour to obtain a composite particle of the objective. In this composite particle, the proportion of the mass of the alloy particle to the sum of the mass of the alloy particle and the mass of the substance originated from coal pitch powder (a binding material, containing a carbon precursor as the main component) was 99.0% (see Table 1). The proportion of the carbon precursor in the binding material was not less than 60 at %.

[Production of Negative Electrode]

The above composite particle, acetylene black (AB) as a conductive assistant, styrene-butadiene rubber (SBR) as a binder (2-fold dilution), and carboxymethylcellulose (CMC) as a thickening agent were mixed in a mass ratio of 75:15:10:5 (blending quantity was 1 g:0.2 g:0.134 g:0.067 g). Then, a kneading machine was used to produce a negative electrode compound slurry by adding distilled water to the mixture such that slurry density was 27.2%. Since the styrene-butadiene rubber was used by being diluted 2-fold with water, 0.134 g of styrene-butadiene rubber was blended when weighing.

The produced negative electrode compound slurry was applied on a copper foil by using an applicator (150 μm). The copper foil applied with the slurry was dried at 100° C. for 20 minutes. The copper foil after drying had a coating film containing the composite particle on the surface. The copper foil having the coating film was subjected to punching to produce a disc-shaped copper foil having a diameter of 13 mm. The copper foil after punching was pressed at a press pressure of 500 kgf/cm² to produce a plate-shaped negative electrode.

[Production of Battery]

The produced negative electrode, EC-DMC-EMC-VC-FEC as the electrolytic solution, a polyolefin separator (ϕ17 mm) as the separator, and a metal Li plate (ϕ19×1 mmt) as the positive electrode material were prepared. Thus prepared negative electrode, the electrolytic solution, the separator, and the positive electrode were used to produce a coin battery of 2016 type. Assembly of the coin battery was performed within a glove box in argon atmosphere.

[Determination of Crystal Structure]

The crystal structure of the phase contained in composite particle was determined by the following method for each of the composite particle before being used for the negative electrode, the composite particle in the negative electrode before initial charging, and the composite particle in the negative electrode after 1 time of charging/discharging. X-ray diffraction measurements were carried out for the target composite particles to obtain measured data. Then, based on the obtained measured data, crystal structures included in the target composite particles were determined by Rietveld method. More specifically, the crystal structures were determined by the following method.

(1) Crystal Structure Analysis of Composite Particle Before Use in Negative Electrode X-ray diffraction measurements were carried out for the composite particles before use in the negative electrode to obtain measured data of X-ray diffraction profile.

To be specific, SmartLab (product of Rigaku Co., Ltd) (rotor target maximum output 9 KW; 45 kV-200 mA was used to obtain X-ray diffraction profiles of the composite particles.

Based on the obtained X-ray diffraction profiles (measured data), crystal structures of alloy phases were analyzed by Rietveld method.

Figure 2:
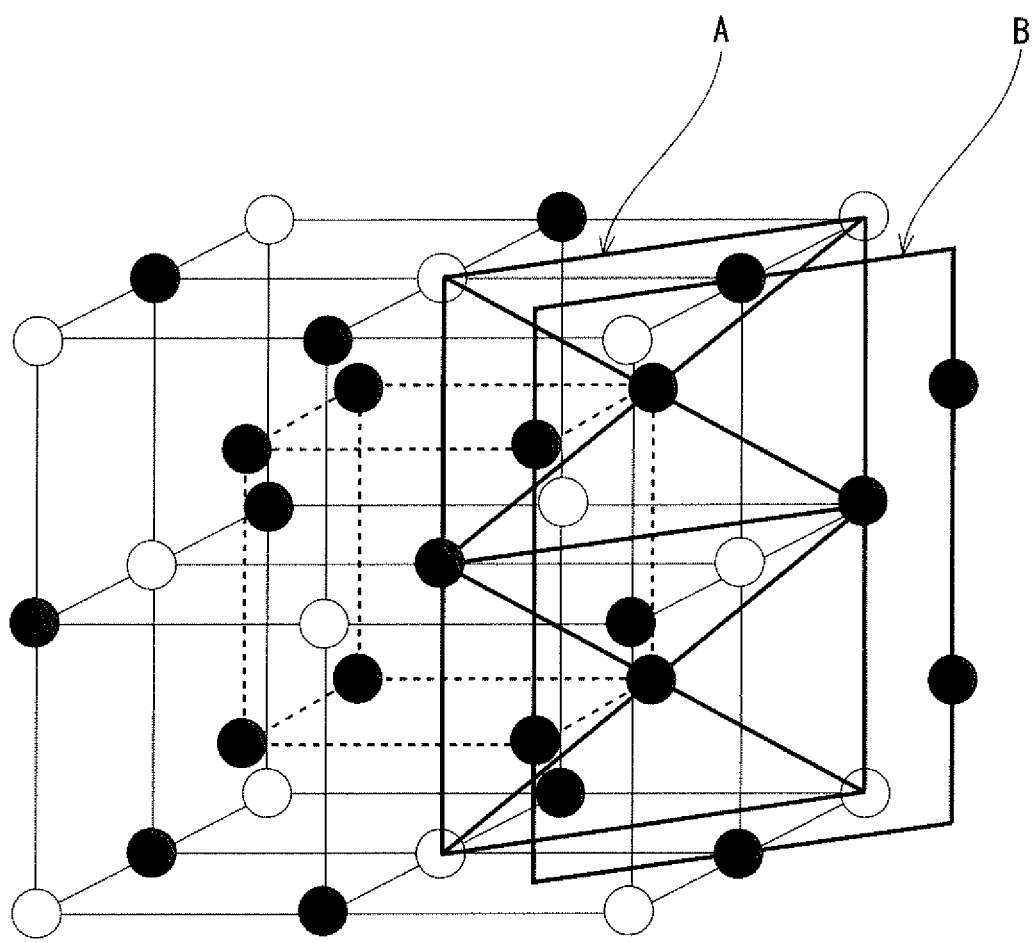
FIG. 2 is a perspective view of $DO_3$ structure.

$DO_3$ regular structure is a regular structure as shown in FIG. 2. In a Cu—Sn base alloy, in FIG. 2, mostly Cu is present at atomic sites indicated by black circles, and mostly Sn is present at atomic sites indicated by white circles. Each site may be replaced by the addition of a third element. It is known that such a crystal structure falls into No. 225 (Fm-3m) of International Table (Volume-A) in the classification of space group representation. The lattice constant and atomic coordinates of this space group number are as shown in Table 2.

TABLE 2

Parent phase ($\beta_1$ Phase), Crystal Structure: $DO_3$
Space Group Number (International Table A): No. 225 (Fm-3m)
Lattice Constant: a = 6.05 Å

| Site Name | Atomic Species | Multiplicity/ Wyckoff Symbol | Atomic Coordinates | | |
|---|---|---|---|---|---|
| | | | x | y | z |
| Sn1 | Sn | 4a | 0.0 | 0.0 | 0.0 |
| Cu1 | Cu | 8c | 1/4 | 1/4 | 1/4 |
| Cu2 | Cu | 4b | 1/2 | 1/2 | 1/2 |

Accordingly, with the structure model of this space group number being as the initial structure model of Rietveld analysis, a calculated value of diffraction profile (hereinafter, referred to as a calculated profile) of $\beta_1$ phase ($DO_3$ structure) of this chemical composition was found by Rietveld method. RIETAN-FP (program name) was used for Rietveld analysis.

Further, a calculated profile of the crystal structure of $\gamma_1'$ phase of this chemical composition was found as well. The crystal structure of $\gamma_1'$ was 2H structure in the notation of Ramsdell symbol, and the space group was No. 59-2 (Pmmn) of International Table (Volume-A). The lattice constant and atomic coordinates of No. 59-2 (Pmmn) are shown in Table 3.

TABLE 3

M Phase ($\gamma_1'$ Phase), Crystal Structure: 2H
Space Group Number (International Table A): No. 59-2 (Pmmn)
Lattice Constants: a = 4.379 Å, b = 5.498 Å, c = 4.615 Å

| Site Name | Atomic Species | Multiplicity/ Wyckoff Symbol | Atomic Coordinates | | |
|---|---|---|---|---|---|
| | | | x | y | z |
| Sn1 | Sn | 2b | 1/4 | 3/4 | 1/6 |
| Cu1 | Cu | 2a | 1/4 | 1/4 | 1/6 |
| Cu2 | Cu | 4e | 1/4 | 0.0 | 2/3 |

A calculated profile was found by using RIETAN-FP supposing that the crystal structure of the space group number of the above describe Table 3 be the initial structure model of Rietveld analysis.

A result of the analysis revealed that a $\gamma_1'$ phase (2H structure) which was a kind of M phase, and $\beta_1$ phase ($DO_3$ structure) which was matrix phase thereof were intermixed in the composite particle of Inventive Example 1.

(2) Crystal Structure Analysis of Composite Particle in Negative Electrode

The crystal structure of a composite particle in a negative electrode before charging was also determined by the same method as that in (1). A measured X-ray diffraction profile was measured by the following method.

The above described coin battery, which was before being charged, was disassembled within the glove box in argon atmosphere, and a plate-shaped negative electrode was taken out from the coin battery. The negative electrode taken out was enclosed in Myler foil (manufactured by DuPont). Thereafter, the perimeter of the Myler foil was sealed by a thermocompression bonding machine. Then, the negative electrode sealed by the Myler foil was taken out of the glove box.

Next, a measurement sample was fabricated by bonding the negative electrode to a reflection-free sample plate manufactured by Rigaku Co., Ltd. (a plate of a silicon single crystal which was cut out such that a specific crystal plane was in parallel with the measurement plane) with a hair spray.

The measurement sample was mounted onto the X-ray diffraction apparatus described below in (4), and the X-ray diffraction measurement of the measurement sample was performed under measurement conditions described below in (4).

(3) Analysis of Crystal Structure of Composite Particle in Negative Electrode after Charging and after Discharging The crystal structure of the composite particle in the negative electrode after one time of charging and after one time of discharging was also determined by the same method as that in (1). Measured X-ray diffraction profiles were measured by the following method.

The above described coin battery was fully charged in a charging/discharging test apparatus. The fully charged coin battery was disassembled in the glove box, and a measurement sample was fabricated by the same method as that in (2). The measurement sample was mounted onto the X-ray diffraction apparatus described below in (4), and X-ray diffraction measurement of the measurement sample was performed under measurement conditions described below in (4).

Moreover, the above described coin battery was fully discharged. The fully discharged coin battery was disassembled in the glove box, and a measurement sample was fabricated by the same method as in (3). The measurement sample was mounted onto the X-ray diffraction apparatus described below in (4), and X-ray diffraction measurement of the measurement sample was performed at measurement conditions described below in (4).

For a negative electrode which bad been subjected to charging and discharging repeatedly in a coin battery, X-ray diffraction measurement was performed by the same method.

(4) X-Ray Diffraction Apparatus and Measurement Conditions

Apparatus: SmartLab (Registered Trademark) manufactured by Rigaku Co., Ltd.
X-ray tube: Cu-Kα ray
X-ray output: 45 kV, 200 mA
Incident monochrometer: Johannson type crystal (which filters out Cu-Kα$_2$ ray and Cu-Kβ ray)
Optical system: Bragg-Brentano geometry
Incident parallel slit: 5.0 degrees
Incident slit: ½ degrees
Length limiting slit: 10.0 mm
Receiving slit 1: 8.0 mm
Receiving slit 2: 13.0 mm
Receiving parallel slit: 5.0 degrees
Goniometer: SmartLab goniometer
X-ray source—mirror distance: 90.0 mm X-ray source—selection slit distance: 114.0 mm
X-ray source—sample distance: 300.0 mm
Sample—receiving slit 1 distance: 187.0 mm
Sample—receiving slit 2 distance: 300.0 mm
Receiving slit 1—receiving slit 2 distance: 113.0 mm
Sample—detector distance: 331.0 mm
Detector: D/Tex Ultra
Scan range: 10 to 120 degrees
Scan step: 0.02 degrees
Scan mode: Continuous scan
Scanning speed: 2 degrees/min (5) Analysis Results of X-Ray Diffraction Measurement Data (5-1)

X-ray diffraction data obtained in (1), (2), and (3) confirmed that there was no significant chemical reaction progressed between the composite particle and the electrolytic solution.

(5-2)

X-ray diffraction profiles of the "composite particle after charging" and X-ray diffraction profiles of the "composite particle after discharging" revealed that diffraction lines reversibly changed repeatedly at a position where the diffraction angle 2θ was near 58.5° (position caused by M phase ($\gamma_1$' phase)) (hereinafter, referred to as an essential diffraction line position). That is, structural change was suggested.

(5-3)

Accordingly, the crystal structures of the "composite particle after charging" and the "composite particle after discharging" were determined by using Rietveld method.

Figure 3A:
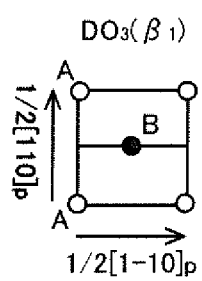
FIG. 3A is a schematic diagram of $DO_3$ structure of the matrix phase of the alloy phase of the present embodiment.
Figure 3B:
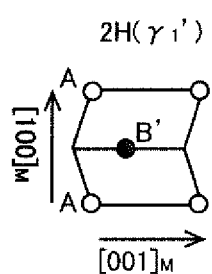
FIG. 3B is a schematic diagram of 2H structure of $\gamma1'$ phase which is a kind of martensite phase.
Figure 3C:
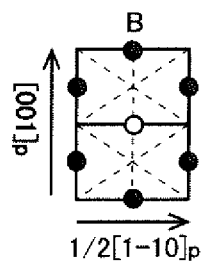
FIG. 3C is a schematic diagram of a crystal plane to explain thermoelastic diffusionless transformation from $DO_3$ structure to 2H structure.
Figure 3D:
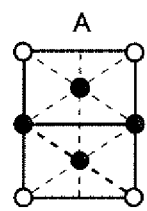
FIG. 3D is a schematic diagram of another crystal plane different from that of FIG. 3C.
Figure 3E:
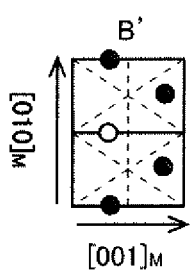
FIG. 3E is a schematic diagram of another crystal plane different from those of FIGS. 3C and 3D.

For example, in the alloy phase in the composite particle, the crystal plane A shown in FIG. 3D and the crystal plane B shown in FIG. 3C are alternately layered in the $DO_3$ structure of the matrix phase shown in FIGS. 2 and 3A. When a phase transformation occurs between the $DO_3$ structure and $\gamma_1$' phase which is a kind of M phase, as shown in FIGS. 3A and 3B, the crystal plane B regularly undergoes shuffling due to shear stress, thereby being displaced to the position of crystal plane B'. In this case, phase transformation (M transformation) occurs without diffusion of the host lattice. In the 2H structure after M transformation, the crystal plane A shown in FIG. 3D and the crystal plane B' shown in FIG. 3E are alternately layered.

Then, it is judged whether the crystal structure of the composite particle in the negative electrode of the present Example involves M transformation or not accompanied thereby (that is, involves diffusion of host lattice at the time of charging/discharging) by comparing the measured data of the X-ray diffraction profiles of the composite particle after charging and after discharging, calculated profile of $\beta_1$ phase ($DO_3$ structure), and calculated profile of $\gamma_1$' phase (2H structure).

In the X-ray diffraction profile, the intensity of diffraction line near 58.5° increased as a result of initial charging, and decreased as a result of consecutive discharging. It can be judged that this diffraction line resulted from the formation of M phase ($\gamma_1$') by M transformation, as will be next described, from calculated profiles of RIETAN-FP.

To be more specific, an intensity peak occurred at 58.5° of an X-ray diffraction profile, in 2H structure. On the other hand, in $DO_3$ structure ((a) in the figure), no intensity peak occurred at 58.5°. In contrast, in the X-ray diffraction profiles after charging, an intensity peak occurred at 58.5°. On the other hand, in the X-ray diffraction profiles after discharging, no intensity peak occurred at 58.5°. Further, the intensity peak at 58.5° did not appear in the X-ray profiles of other crystal structures (simulation result) besides 2H.

From the above, the negative electrode of the present Example contained an alloy phase which underwent M transformation to become M phase (2H structure) as a result of charging, and became a matrix phase ($DO_3$ structure) as a result of discharging. That is, the negative electrode of the present Example contained an alloy phase which underwent M transformation when occluding lithium ions which are metal ions, and underwent reverse transformation when releasing lithium ions.

[Charge-Discharge Performance Evaluation of Coin Battery]

Next, discharge capacity and cycle characteristics of the battery of Inventive Example 1 were evaluated.

Constant current doping (corresponding to the insertion of lithium ions into the electrode, and the charging of lithium ion secondary battery) was performed on a coin-type non-aqueous test cell at a current value of 0.56 mA/cm² until the potential difference against the counter electrode becomes 5 mV, and thereafter doping was further continued against the counter electrode at a constant voltage until the current value became 7.5 μA/cm² while retaining 5 mV to measure doping capacity. Next, de-doping (corresponding to desorption of lithium ions from the electrode, and discharge of the lithium ion secondary battery) was performed at a constant current of 0.56 mA/cm² until the potential difference became 1.2 V, to measure de-doping capacity. Since the doping capacity and de-doping capacity at this moment corresponded to a charge capacity (mAh/g) and a discharge capacity (mAh/g) when this electrode was used as the negative electrode of the lithium ion secondary battery, they were defined as the charge capacity and the discharge capacity. Then, an efficiency (%) of initial charging/discharging was defined as "a discharge capacity (initial discharge capacity in Table 1) at the time of de-doping of the first cycle" divided by "a charge capacity at the time of doping of the first cycle" and multiplied by 100.

Doping and de-doping were repeated 30 times under the same conditions as described above. Then, a cycle retention ratio (%) was defined as "a discharge capacity at the time of de-doping of the 30th cycle" divided by "a discharge capacity at the time of de-doping of the first cycle" and multiplied by 100.

In the coin battery relating to the present embodiment, the initial discharge capacity was 128.6 mAh/g, the efficiency of initial charging/discharging was 63.0%, and the cycle retention ratio was 49.4% (see Table 1).

Inventive Examples 2 to 6 of the Present Invention and Comparative Example 1

In Inventive Examples 2 to 6, composite particles, negative electrodes, and coin batteries were produced in the same way as in Inventive Example 1 excepting that the proportion of the mass (mixing ratio) of the alloy particle to the sum of the mass of the alloy particle and the mass of the coal pitch powder was changed to the proportion shown in Table 1.

In Comparative Example 1, the negative electrode and coin battery were produced by using only the specific particle in Inventive Example 1.

Determination of crystal structure and charge-discharge performance evaluation were performed in the same way as in Inventive Example 1.

The results of the determination of crystal structure revealed that in any of Inventive Examples and in any of Comparative Examples, all of the crystal structures of the composite particles or particles in the negative electrode after one time of discharging included $DO_3$ structure. Further, all of the crystal structures of the composite particles or particles after one time of charging included 2H structure. To be specific, after one time of charging, an intensity peak was confirmed in a range of near 58.5° of diffraction angle 2θ (hereinafter, referred to a specific diffraction angle range) in the X-ray diffraction profile. Moreover, after discharging, no peak was confirmed in the specific diffraction angle range. Therefore, this confirmed that the alloy phases of Inventive Examples 2 to 6 and Comparative e Example 1 had a crystal structure that underwent M transformation when occluding lithium ions, and underwent reverse transformation when releasing lithium ions.

Results of the charge-discharge performance evaluation were as shown in Table 1. The initial discharge capacity and the efficiency of initial charging/discharging were more satisfactory as the proportion of the total mass of the specific particles to that of the biding material increased. The cycle retention ratio was more satisfactory as the proportion of the total mass of the specific particles to that of the binding material decreased. Considering the balance of these performances, the proportion of the total mass of the specific particles to that of the binding material is preferably 95% to 99.5%.

Inventive Example 7 and Comparative Example 2

In Inventive Example 7, the composite particle, negative electrode, and coin battery were produced in the same way as in Inventive Example 2 excepting that the alloy phase composition of the specific particle was changed to the composition shown in Table 1.

In Comparative Example 2, the negative electrode and coin battery were produced by using only the specific particle in Inventive Example 7.

Determination of crystal structure and charge-discharge performance evaluation were performed in the same way as in Inventive Example 1.

The results of the determination of crystal structure revealed that in Inventive Example 7 and Comparative Example 2 as well, both of the crystal structures of the composite particles or particles in the negative electrode after one time of discharging included $DO_3$ structure. Further, both of the crystal structures of the composite particles or particles after one time of charging included 2H structure. To be Specific, after one time of charging, an intensity peak was confirmed in a range of near 58.5° of diffraction angle 2θ (hereinafter, referred to as a specific diffraction angle range) in the X-ray diffraction profile. Moreover, after discharging, no peak was confirmed in the specific diffraction angle range. Thus, this confirmed that the alloy phases of Inventive Example 7 and Comparative Example 2 had a crystal structure that underwent M transformation when occluding lithium ions, and underwent reverse transformation when releasing lithium ions.

Results of the charge-discharge performance evaluation are as shown in Table 1. The composite particle having a binding material (Inventive Example 7) exhibited a remarkably more excellent cycle retention ratio than one having a specific particle alone (Comparative Example 2).

Inventive Example 8 and Comparative Example 3

In Inventive Example 8, the composite particle, negative electrode, and coin battery were produced in the same way as in Inventive Example 2 excepting that the alloy phase composition of the specific particle was changed to the composition shown in Table 1.

In Comparative Example 3, the negative electrode and coin battery were produced by using only the specific particle in Inventive Example 8.

Determination of crystal structure and charge-discharge performance evaluation of the coin battery were performed in the same way as in Inventive Example 1.

The results of the determination of crystal structure revealed that in Inventive Example 8 and Comparative Example 3 as well, both of the crystal structures of the composite particles or particles in the negative electrode after one time of discharging included $DO_3$ structure. Further, both of the crystal structures of the composite particles or particles after one time of charging included 2H structure. To be Specific, after one to multiple times of charging, an intensity peak was confirmed in a range of near 58.5° of diffraction angle 2θ (hereinafter, referred to as a specific diffraction angle range) in the X-ray diffraction profile. Moreover, after discharging, no peak was confirmed in the specific diffraction angle range. Thus, this confirmed that the alloy phases of Inventive Example 8 and Comparative Example 3 had a crystal structure that underwent M transformation when occluding lithium ions, and underwent reverse transformation when releasing lithium ions.

Results of the charge-discharge performance evaluation are as shown in Table 1. A composite particle having a binding material (Inventive Example 8) exhibited a remarkably more excellent cycle retention ratio than Comparative Example 3.

Inventive Example 9 and Comparative Example 4

In Inventive Example 9, the composite particle, negative electrode, and coin battery were produced in the same way as in Inventive Example 2 excepting that the alloy phase composition of the specific particle was changed to the composition shown in Table 1.

In Comparative Example 4, the negative electrode and coin battery were produced by using only the specific particle in Inventive Example 8.

Determination of crystal structure and charge-discharge performance evaluation of the coin battery were performed in the same way as in Inventive Example 1.

The results of the determination of crystal structure revealed that in Inventive Example 9 and Comparative Example 4 as well, both of the crystal structures of the composite particles or particles in the negative electrode after one time of discharging included $DO_3$ structure. Further, both of the crystal structures of the composite particles or particles after one time of charging included 2H structure. To be Specific, after one time of charging, an intensity peak was confirmed in a range of near 58.5° of diffraction angle 2θ (hereinafter, referred to as a specific diffraction angle range) in the X-ray diffraction profile. Moreover, after discharging, no peak was confirmed in the specific diffraction angle range. Thus, this confirmed that the alloy phases of Inventive Example 9 and Comparative Example 4 had a crystal structure that underwent M transformation when occluding lithium ions, and underwent reverse transformation when releasing lithium ions.

Results of the charge-discharge performance evaluation are as shown in Table 1. A composite particle having a binding material (Inventive Example 9) exhibited a remarkably more excellent cycle retention ratio than one having a specific particle alone (Comparative Example 4).

So far, embodiments of the present invention have been described. However, the above described embodiments are merely examples to carry out the present invention. Therefore, the present invention will not be limited to the above described embodiments, and can be carried out by appropriately modifying the above described embodiments within a range not departing from the spirit thereof.

The invention claimed is:

1. A composite particle, comprising:
   a plurality of specific particles each of which contains an alloy phase, and
   a binding material which contains at least one of non-graphite carbon and a carbon precursor, and binds with the plurality of specific particles, wherein
   the alloy phase undergoes thermoelastic diffusionless transformation when releasing metal ions or occluding the metal ions.
2. The composite particle according to claim 1, wherein a proportion of a total mass of the plurality of specific particles to a sum of the total mass of the plurality of specific particles and a mass of the binding material is 95% to 99.5%.
3. The composite particle according to claim 2, wherein at least some of the plurality of specific particles are exposed to an outside of the composite particle.
4. The composite particle according to claim 1, wherein at least some of the plurality of specific particles are exposed to an outside of the composite particle.
5. The composite particle according to claim 4, wherein the alloy phase undergoes the thermoelastic diffusionless transformation when occluding the metal ions, and undergoes reverse transformation when releasing the metal ions.
6. The composite particle according to claim 1, wherein the alloy phase undergoes the thermoelastic diffusionless transformation when occluding the metal ions, and undergoes reverse transformation when releasing the metal ions.
7. The composite particle according to claim 6, wherein the alloy phase after the thermoelastic diffusionless transformation contains a crystal structure which is 2H in Ramsdell notation, and
   the alloy phase after the reverse transformation contains a crystal structure which is $DO_3$ in Strukturbericht notation.
8. The composite particle according to claim 7, wherein the alloy phase contains Cu and Sn.
9. The composite particle according to claim 8, wherein the alloy phase contains, in place of a part of Cu, one or more selected from the group consisting of Ti, V, Cr, Mn, Fe, Co, Ni, Zn, Al, Si, B, and C.
10. The composite particle according to claim 9, wherein the alloy phase contains:
    Sn: 10 to 35 at %, and
    one or more selected from the group consisting of Ti: 9.0 at % or less, V: 49.0 at % or less, Cr: 49.0 at % or less, Mn: 9.0 at % or less, Fe: 49.0 at % or less, Co: 49.0 at % or less, Ni: 9.0 at % or less, Zn: 29.0 at % or less, Al: 49.0 at % or less, Si: 49.0 at % or less, B: 5.0 at % or less, and C: 5.0 at % or less,
    with the balance being Cu and impurities.
11. The composite particle according to claim 6, wherein the alloy phase contains Cu and Sn.
12. The composite particle according to claim 11, wherein the alloy phase contains, in place of a part of Cu, one or more selected from the group consisting of Ti, V, Cr, Mn, Fe, Co, Ni, Zn, Al, Si, B, and C.
13. The composite particle according to claim 12, wherein the alloy phase contains:
    Sn: 10 to 35 at %, and
    one or more selected from the group consisting of Ti: 9.0 at % or less, V: 49.0 at % or less, Cr: 49.0 at % or less, Mn: 9.0 at % or less, Fe: 49.0 at % or less, Co: 49.0 at % or less, Ni: 9.0 at % or less, Zn: 29.0 at % or less, Al: 49.0 at % or less, Si: 49.0 at % or less, B: 5.0 at % or less, and C: 5.0 at % or less,
    with the balance being Cu and impurities.
14. A negative electrode, comprising a composite particle according to claim 1 as an active material.
15. A battery, comprising a negative electrode according to claim 14.
16. A composite particle, comprising:
    a plurality of specific particles containing an alloy phase; and
    a binding material containing at least one of non-graphite carbon and a carbon precursor, and binding with the plurality of specific particles, wherein
    the alloy phase contains Cu and Sn.
17. The composite particle according to claim 16, wherein the alloy phase contains, in place of a part of Cu, one or more selected from the group consisting of Ti, V, Cr, Mn, Fe, Co, Ni, Zn, Al, Si, B, and C.
18. The composite particle according to claim 17, wherein the alloy phase contains:
    Sn: 10 to 35 at %, and
    one or more selected from the group consisting of Ti: 9.0 at % or less, V: 49.0 at % or less, Cr: 49.0 at % or less, Mn: 9.0 at % or less, Fe: 49.0 at % or less, Co: 49.0 at % or less, Ni: 9.0 at % or less, Zn: 29.0 at % or less, Al: 49.0 at % or less, Si: 49.0 at % or less, B: 5.0 at % or less, and C: 5.0 at % or less,
    with the balance being Cu and impurities.
19. A negative electrode, comprising a composite particle according to claim 16 as an active material.
20. A battery, comprising a negative electrode according to claim 19.

* * * * *